US007068367B2

(12) United States Patent
Stobrawa et al.

(10) Patent No.: US 7,068,367 B2
(45) Date of Patent: Jun. 27, 2006

(54) ARRANGEMENT FOR THE OPTICAL DETECTION OF A MOVING TARGET FLOW FOR A PULSED ENERGY BEAM PUMPED RADIATION

(75) Inventors: Gregor Stobrawa, Jena (DE); Mark Bischoff, Elleben (DE); Roland Sauerbrey, Jena (DE); Wolfgang Ziegler, Jena (DE); Klaus Ruehle, Jena (DE)

(73) Assignee: XTREME technologies GmbH, Jena (DE)

( * ) Notice: Subject to any disclaimer, the term of this patent is extended or adjusted under 35 U.S.C. 154(b) by 185 days.

(21) Appl. No.: 10/682,000

(22) Filed: Oct. 8, 2003

(65) Prior Publication Data

US 2004/0105095 A1 Jun. 3, 2004

(30) Foreign Application Priority Data

Oct. 8, 2002 (DE) ................................ 102 47 386

(51) Int. Cl.
*G01J 3/30* (2006.01)

(52) U.S. Cl. ........................................ 356/318; 356/72

(58) Field of Classification Search ................ 356/318, 356/72–73

See application file for complete search history.

(56) References Cited

U.S. PATENT DOCUMENTS 4,510,504 A 4/1985 Tamai et al.
6,792,076 B1 * 9/2004 Petach et al. ............... 378/119
6,882,704 B1 * 4/2005 Schriever et al. ........... 378/119

FOREIGN PATENT DOCUMENTS

| | | |
|---|---|---|
| DE | 101 49 654 | 4/2003 |
| WO | WO 02/11499 | 2/2002 |
| WO | WO 02/32197 | 4/2002 |

* cited by examiner

*Primary Examiner*—Layla G. Lauchman
*Assistant Examiner*—Kara Geisel
(74) *Attorney, Agent, or Firm*—Reed Smith LLP

(57) ABSTRACT

The invention is directed to an arrangement for the optical detection of a moving target flow for pulsed energy beam pumped radiation generation based on a plasma. It is the object of the invention to find a novel possibility for detection of a moving target flow for energy beam pumped radiation generation based on a plasma which allows reliable orientation of the excitation beam on the target without the detector being subjected to influence and damage due to radiation emitted by the plasma. According to the invention, this object is met in that a target generator provides a target flow with relatively constant target states in an interaction point, a sensor unit is directed to a detection point which lies close to the interaction point in the direction of the path. The sensor unit contains a projection module which has a defined focal length and numerical aperture, so that only transmission light reflected from the detection point is received by the projection module and is directed via a light waveguide to the detection module which is arranged at a spatial distance, and the sensor unit also contains a detection module.

37 Claims, 4 Drawing Sheets

ARRANGEMENT FOR THE OPTICAL DETECTION OF A MOVING TARGET FLOW FOR A PULSED ENERGY BEAM PUMPED RADIATION

CROSS-REFERENCE TO RELATED APPLICATION

This application contains the priority of German Application No. 102 47 386.2, filed Oct. 8, 2002, the disclosure of which is hereby incorporated by reference.

BACKGROUND OF THE INVENTION a) Field of the Invention

The invention is directed to an arrangement for the optical detection of a moving target flow for pulsed energy beam pumped radiation generation based on a plasma, for example, for the generation of extreme ultraviolet radiation (EUV), soft x-ray radiation or particle radiation.

b) Description of the Related Art

When intensive laser radiation interacts with material, soft-x-ray radiation, particularly EUV radiation, and particle radiation, can be generated under defined conditions. For this purpose, intensive laser pulses are conducted to a solid, liquid or gaseous material (target) and generate in the latter a plasma which emits the desired radiation. When liquids are used as target material and introduced into an evacuated interaction chamber by a target generator, these moving targets must advantageously be excited identically as far as possible by the high-energy excitation beam in an advantageous manner. Only in this way can an efficient and stable radiation be generated.

WO 02 11 499 A1 discloses a method for the generation of x-ray radiation or EUV radiation in which an electron beam is made to interact with a moving target jet in a vacuum chamber. In this case, in order to adjust the desired type of radiation—soft x-ray radiation or EUV radiation—the electron beam that is used is directed to a liquid target flow that is ejected from a pressure chamber through a nozzle for generating a plasma. This solution provides no information about the wavelength stability and energy stability of the radiation which is accordingly insufficiently defined for exposure processes in semiconductor fabrication.

Therefore, in order to stabilize radiation generation, another solution was suggested in WO 02 32 197 A1 in connection with the generation of EUV radiation. This solution involves regulation based on a temperature measurement of the outlet nozzle of the liquid jet.

The solutions described above share the disadvantage that the position of the target flow during plasma excitation by high-energy radiation (e.g., a laser beam or electron beam) is not monitored, so that variations in emissions occur due to the different location of the targets. This can not be tolerated, e.g., in photolithography exposure machines.

Further, it is known from the prior art to use a continuous transmitted emission and a time-variable return emission of moving objects or of objects with variable reflectivity. For example, for the purpose of determining the position of drops in inkjet printing technology, U.S. Pat. No. 4,510,504 describes a device for optical determination of the position of a drop in which the light of a light-emitting diode which is reflected by the drop reaches a photodetector. This arrangement is so constituted that the drop reflects light in the direction of the detector and accordingly generates a signal only at a defined position. An arrangement of this kind is obviously not suitable for detection of the drop position in a vacuum chamber in plasma generation for x-ray generation because it detects the scatter light of the energy beam used for plasma generation along with the radiation emitted by the plasma, so that precise measurement is not possible. In addition, the active electronic components are influenced in an impermissible manner when radiation is generated in the vicinity of the plasma due to the extreme environmental conditions (for example, hard x-ray radiation with high intensity or neutron radiation) and their useful life is considerably diminished.

OBJECT AND SUMMARY OF THE INVENTION

It is the primary object of the invention to find a novel possibility for optical detection of a linearly moving target flow for pulsed energy beam pumped radiation generation under constant conditions which allows a reliable control of the synchronization of target movement and energy beam pumped excitation without a radiation detector being subjected to impermissible influence and damage due to emissions generated from the plasma.

In an arrangement for the optical detection of a moving target flow for pulsed energy beam pumped radiation generation based on a plasma in which a target generator is provided for generating a target flow advancing along a path and an energy beam for plasma generation is directed to a defined interaction point of the path of the target flow, this interaction point being located in a vacuum chamber for plasma generation, the above-stated object is met, according to the invention, in that the target generator provides a target flow of moving material with relatively constant target states in the interaction point, wherein the target flow has, at least in a recurring manner over time, identical conditions for the generation of plasma for radiation emission, in that a sensor unit is provided for observation of the position of the target flow at a detection point which lies at a short distance from the interaction point on the path, wherein the sensor unit is provided for illuminating the target flow moving past with transmission light and for receiving proportions of the transmission light that are reflected at a portion of the illuminated target flow, in that the sensor unit contains a detection module and a projection module, wherein the projection module has means for focusing the transmission light onto the detection point in the target flow, so that transmission light which is reflected from the detection point is received simultaneously by the projection module and is directed to the detection module, the detection module is arranged at a spatial distance from the projection module so as to be shielded from interfering influences from plasma generation and resulting radiation, and a light waveguide is provided between the detection module and projection module for transmitting transmission light and optical signals resulting from reflected portions of the transmission light at the target flow passing the detection point.

The target flow is advantageously a flow of discrete mass-limited liquid drops or solid targets of frozen liquids or gases, the projection module being oriented in lateral and longitudinal direction to a detection point along the path of the moving drops for detecting the target.

The target flow can also advantageously be a (continuous) liquid jet, wherein the projection module is required only for detection of variations in lateral direction. For this purpose, the projection module is preferably directed to the center of the jet. However, it can also be useful to direct it to the edge area of the jet, e.g., when the surface continuity of the jet is to be monitored.

The projection module is advantageously arranged with its optical axis substantially orthogonal to the direction of the path of the target and essentially different than the direction of the optical axis of the excitation laser. Further, it is advisable to arrange the projection module with its optical axis essentially orthogonal to the direction of the optical axis of the excitation laser. Large discrepancies from the orthogonal position are by all means permissible.

The projection module advantageously contains focusing optical elements for coupling the transmission light out of the light waveguide and for focusing on a spatial region having a smaller extent than the lateral dimension of the target flow. The projection module itself should be located at a minimum distance of at least a few centimeters from the plasma.

The projection module advisably has focusing optics with a focal length of a few centimeters and a numerical aperture that is selected in such a way that a focus of the transmission light generated by the focusing optics in the detection point is smaller than the diameter of the target flow and proportions of the transmission light reflected by the latter are received.

The projection module is directed with its optical axis to a detection point which is at a distance along the path of the target flow of several millimeters to several centimeters from the interaction point of the excitation laser beam. The optimal distance from the interaction point must be adjusted as a compromise between the desired economical compactness of the projection module and the necessary accuracy of position determination at the interaction point of the target.

In a first advisable variant, the optical axis of the projection module is at a distance of several centimeters to decimeters from the interaction point. For a relatively large distance from the interaction point such as this, the projection module has simple optics with a suitable numerical aperture and a short focal length of the projection module, but an extrapolation of measurement values from the detection point to the interaction point is required for subsequent evaluation of the target position.

In a second advantageous variant, the optical axis of the projection module is at a distance of only a few millimeters from the interaction point. At such a short distance from the interaction point, the projection module has projection optics with a greater focal length but the same numerical aperture, so that a subsequent accurate determination of the position of the target flow can be achieved without laborious extrapolation calculations.

The detection module advantageously contains optical elements for generating the transmission light, for coupling the transmission light into the light waveguide and for coupling the transmission light out of the light waveguide, an optical component for separating proportions of the transmission light that are reflected or backscattered in the detection point as optical measurement signals, and an optoelectronic detector for converting the optical measurement signal into an electric signal.

The optical component for separating the optical measurement signal can advisably be a light waveguide with integrated direction-dependent signal splitting, particularly a fiber-optic circulator. In another preferable variant, the optical component for separating the optical measurement signal is a polarization-optical beam splitter, in which case the transmission light is linearly polarized. A polarization-preserving fiber is preferably used as light waveguide between the detection module and projection module.

The detection module advantageously has a coherent continuous light source as radiation source for the transmission light, preferably in the visible or near infrared spectral region with collimated light bundles. The radiation source advantageously has a narrow spectral radiation characteristic which is different than the wavelength of the excitation laser when the latter is used as energy beam. When suitable spectral filters are used, the interfering influence of the scatter light of the excitation laser and plasma can be extensively suppressed.

A waveguide-coupled luminescent diode, preferably a fiber-coupled luminescent diode, a multimode laser diode or a fiber laser can also be used as radiation source. In another advantageous variant, the detection module has a short pulse laser with a high repetition rate as radiation source.

When a laser source is used, the light waveguide between the detection module and the projection module is preferably a single-mode fiber, so that only one fundamental mode of the laser radiation used as transmission light can be transmitted.

The detection module can advantageously have an additional half-wave plate for polarization control and/or a spectral filter element with high transmission for the optical measurement signal reflected by the target.

Further, it is advisable to outfit the detection module with rotatable wedge plates for orienting the transmission light bundle when entering the light waveguide. These rotatable wedge plates facilitate the alignment of transmission light bundles and light waveguides for initial and subsequent alignment.

The detection module is followed in a suitable manner by an electronic circuit for amplifying and processing the electric signal converted from the reflected optical signals and for generating a synchronization signal. This electronic circuit is preferably provided for generating a synchronization signal for the source of the energy beam (e.g., excitation laser) and/or a synchronization signal for the target generator.

The basic idea behind the invention is that for a reproducible plasma generation by means of a high-energy beam (e.g., a laser beam or electron beam) at a target flow, particularly a flow of liquid droplets or frozen mass-limited targets or a continuous liquid jet, detection of the target flow must be carried out in the immediate vicinity of the interaction point. The distance of the detection point from the interaction point should be only a few millimeters, if possible, and at most a few centimeters assuming target diameters of 10 μm to several hundred μm and a diameter of the emitted plasma in the range of 100 μm to 1000 μm. The detection process may not be impaired by laser light of the excitation laser that is scattered by the target or by radiation emitted from the plasma or by electronic interference caused by the pulsed plasma generation, i.e., the detection device for the targets must not be susceptible to electric and magnetic interference from the plasma and must have long-term stability relative to the radiation emitted therefrom, for example, EUV radiation, x-ray radiation or particle radiation, and relative to the required environmental conditions, particularly a high vacuum.

Further, the detector may not substantially limit the solid angle at which the desired radiation emitted by the plasma can be collected through a special optical arrangement (a solid angle of at least $2\pi$ steradian (sr) in the case of EUV generation).

Following the requirements stated above, the invention adopts the solution of constructing a detection device from a detection module and a projection module with a light waveguide connection therebetween in order to be able to position the optoelectronic detector at a location outside of and at a distance from the interaction chamber which is protected from interfering electromagnetic radiation and particle radiation while nevertheless achieving the necessary closeness of the detection point and interaction point by means of a projection module.

The projection module is formed in such a way that it contains only passive optical components which serve to focus the transmission light exiting from the light waveguide and which can easily be replaced, and that only electromagnetic radiation returns from the detection point to the light waveguide.

The arrangement according to the invention enables optical detection of a linearly moving target flow for pulsed energy beam pumped radiation generation under constant conditions. The detector signal permits a dependable control of the synchronization of target movement and energy beam pumped excitation without the detector being subjected to impermissible influence and damage by emissions (radiation and/or particles) generated from the plasma.

In the following, the invention will be described more fully with reference to the drawings and embodiment examples.

DESCRIPTION OF THE PREFERRED EMBODIMENTS

Figure 1:
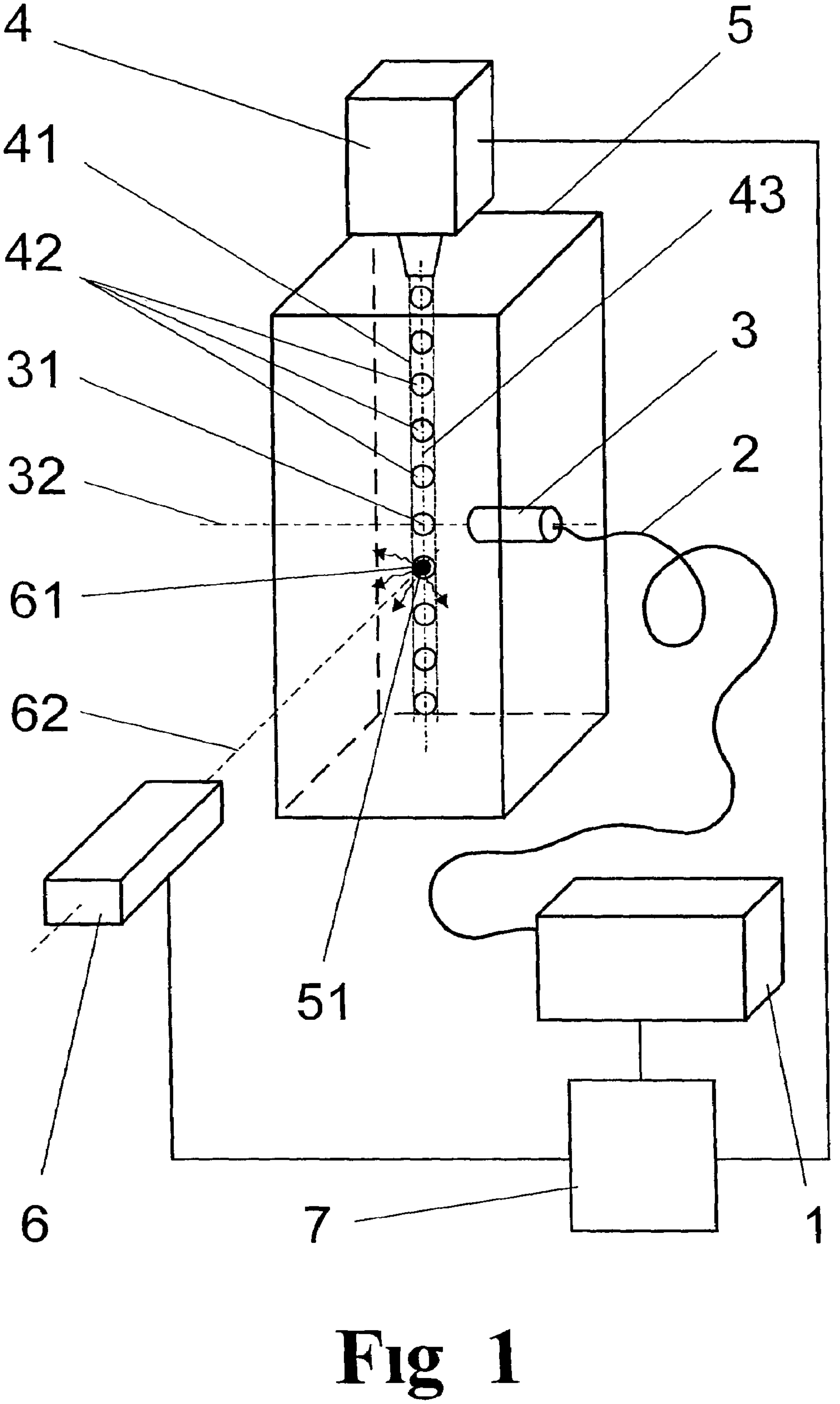
FIG. 1 shows the basic construction of the apparatus.

As is shown in FIG. 1, the arrangement basically comprises a detection module 1, a light waveguide 2, a projection module 3, and a target generator 4. The target generator 4 generates a target flow 41 whose path 43 traverses the interaction point 61 of an excitation laser 6 used for energy beam pumped plasma generation at a defined location within an interaction chamber 5 provided for the plasma generation.

Without limiting generality, a discontinuous flow of drops 42 will be shown and described in the following as a target flow 41 for plasma generation. However, it will be clear to the person skilled in the art that a discontinuous flow of solid targets as well as a continuous target flow 41 (et, such as is shown in dashes in FIGS. 1 and 3) is subject to the same conditions. A continuous target flow 41 is a simplified example of a flow of droplets 42 because the adjustment of constant excitation conditions for the excitation laser 6 at the continuous target flow 41 is still limited only to variations in lateral direction to the path 43 of the target flow 41.

Within this meaning, the following example describes the more demanding realization of a droplet detection arrangement in which, besides the lateral position deviation, the time sequence of individual targets (liquid or frozen drops 42) must necessarily be monitored in longitudinal direction of the path 43. Likewise, the nonlimiting use of a laser beam as excitation beam for the plasma 51 is also referred to. In this case, other types of high-energy radiation suitable for the excitation of the plasma 51 will also be considered (such as an electron beam).

The configuration of the arrangement in FIG. 1 shows that the projection module 3 is arranged with respect to the excitation laser 6 in such a way that it is directed to a detection point 31 on the path 43 of the drops 42 before the interaction point 61 of the excitation laser 6. The interaction point 61 for generating the plasma 51 should be arranged at the shortest possible distance (desired quantity is a few millimeters) after the detection point 31 of the projection module 3 in order to be able to predict with sufficient reliability the current position of the drop 42 and the time of its arrival at the interaction point 61.

The projection module 3 illuminates not only the target flow 41 formed of drops 42, but at the same time also functions as a receiver head for receiving returning light which is reflected or backscattered at a drop 42 at the detection point 31 and for sending back the received light to the detection module 1.

The optical axis 62 of the excitation laser 6 and the optical axis 32 of the projection module 3 are advisably oriented orthogonal to the path 43 of the drops 42 in order to limit interference light which also impinges in the projection module 3.

Figure 3:
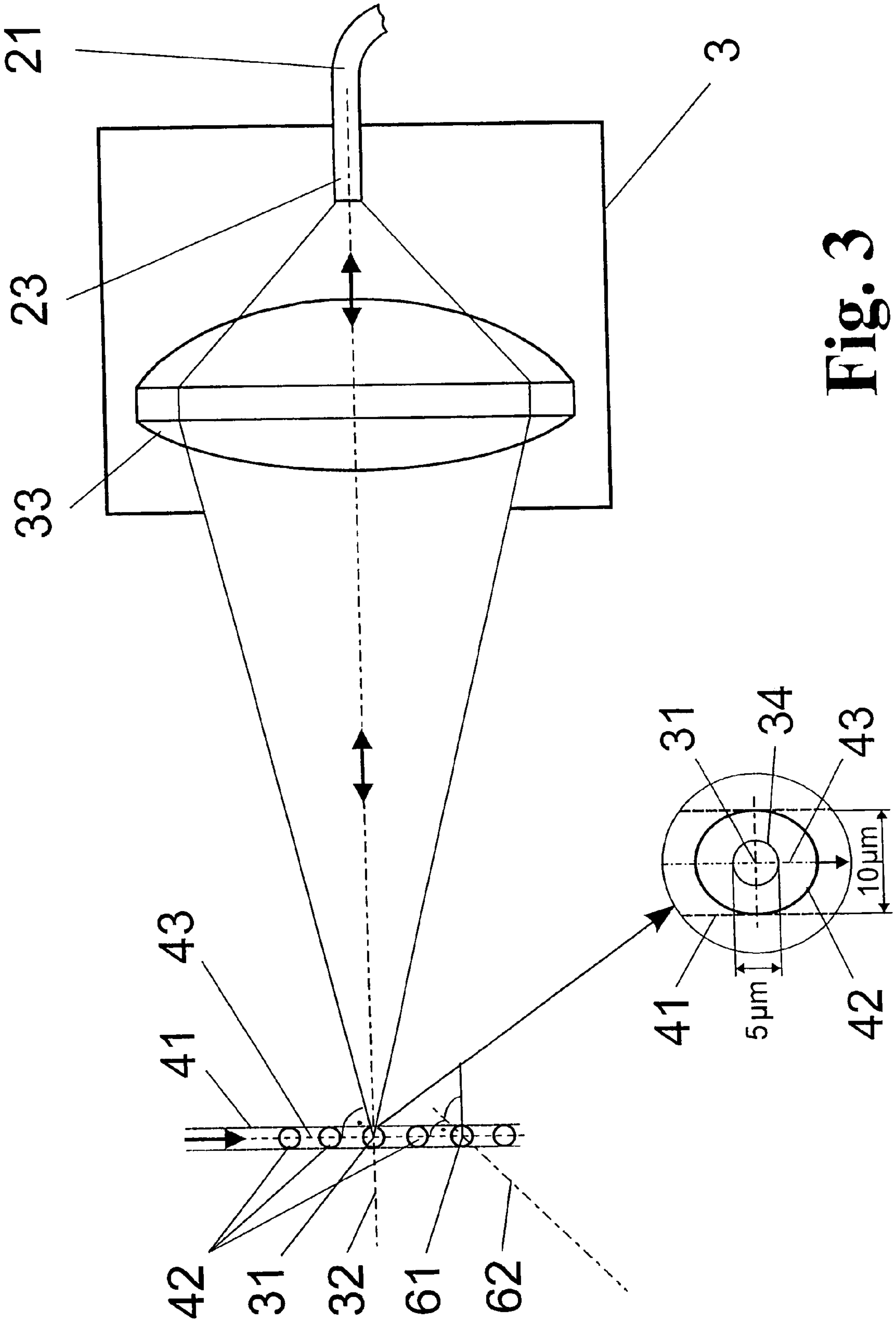
FIG. 3 shows constructional variants of the projection module.

In order to further reduce the possibility of direct or scattered beam components of the excitation laser 6 and of the plasma 51 (in short, interference light) from entering the projection module 3, the optical axis 32 of the projection module 3 is also different from the optical axis 62 of the excitation laser 6. The path 43, optical axis 62 of the excitation laser 6 and optical axis 32 of the projection module 3 all preferably extend orthogonal to one another as is indicated in FIGS. 1 and 3, i.e., ignoring the position of the detection point 31 in front of the interaction point 61, they form an orthogonal system.

In addition, the transmission light can be separated even better from the above-mentioned interfering influences of the laser radiation in that the transmission light source 11 emits a beam having a wavelength which is appreciably different than that of the excitation laser 6. The proportion of transmission light that is preferably generated in the detection module 1, transmitted to the target flow 41 via the projection module 3, and finally transmitted back into the detection module 1 by reflection or scattering can then be separated from the received interference light (from the laser 6 or plasma 51) in the optical beam path up to the detector 5 by means of spectral filters 18.

As a result of this arrangement, the interaction point 61 (excitation location of the plasma 51) and detection point 31 can be as close together as possible, so that the time for the resolution of the laser pulse can be synchronized in a simple manner depending on the point in time of the presence of a drop 42 in the detection point 31 of the projection module 3.

Figure 2:
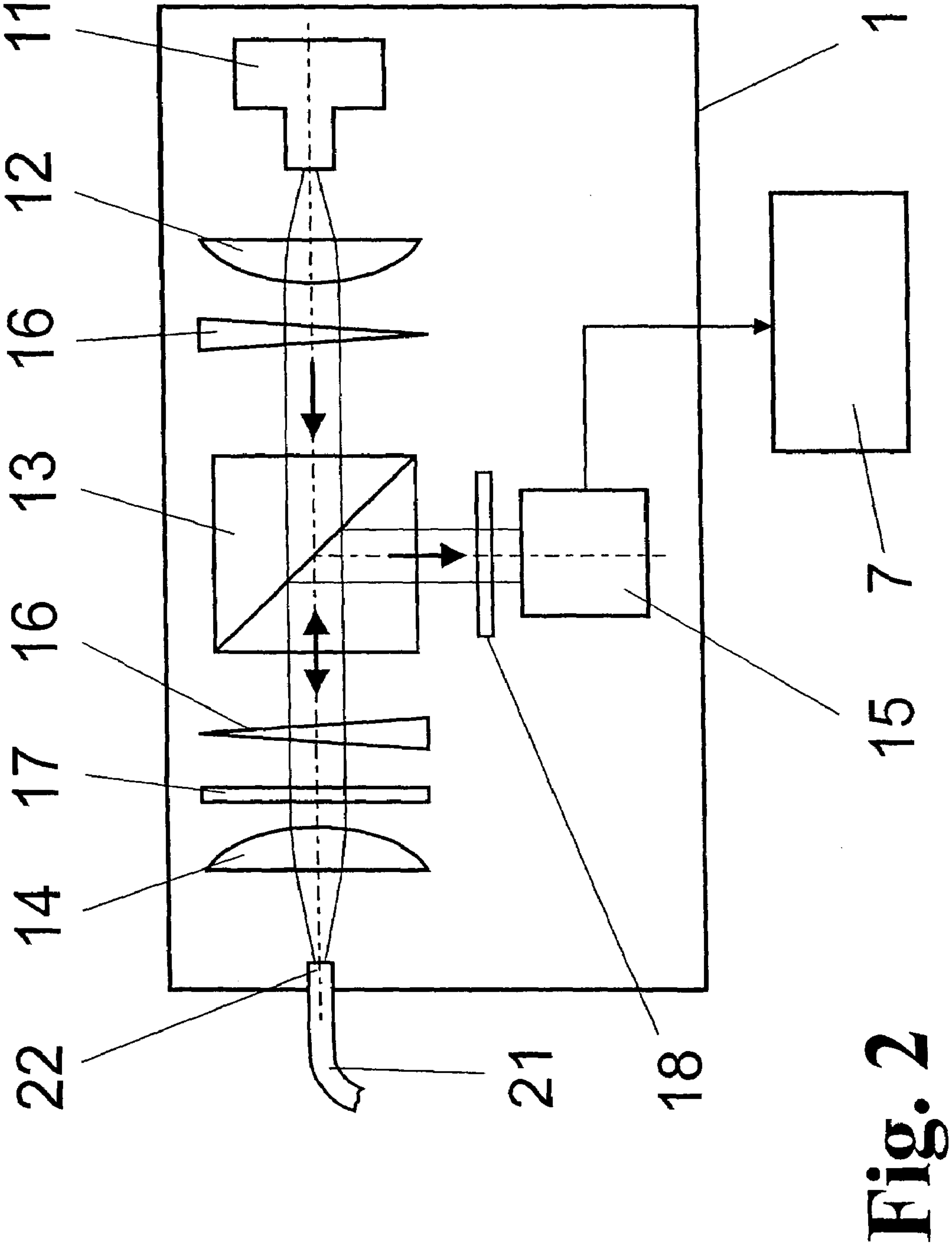
FIG. 2 shows constructional variants of the detection module.

To detect the presence of a drop 42 in the detection point 31 of the projection module 3, the detection module 1 which is arranged at a distance and is shielded contains—as shown in FIG. 2—a transmission light source 11 (e.g., a laser diode) which preferably generates continuously linearly polarized transmission light whose wavelength lies primarily in the visible or near infrared spectral region and which is distinctly different than the wavelength of the excitation laser 6. This transmission light is collimated through a collimating lens 12, then traverses a polarization-optical beam splitter 13 virtually without being influenced and is then coupled into a glass fiber 21 (as a special construction of the light waveguide 2) by an in-coupling lens 14. The transmission light is transmitted from a detection-side end 22 of the glass fiber 21 from the detection module 1 to the projection module 3 arranged in the interaction chamber 5 (vacuum chamber).

In this example, in which a polarization-optical beam splitter 13 is provided for dividing the reflected transmission light to be detected, a glass fiber 21 which preserves polarization for the transmission light and which should be a single-mode fiber when laser light sources are used as a transmission light source 11 is preferably used as light waveguide 2. Aside from a multimode laser diode, a fiber laser or a short pulse laser with a high repetition rate could also be used as laser light sources.

The glass fiber 21 is linked to the projection module 3 by its projection-side fiber end 23 as is indicated in FIG. 3. The projection module 3 contains only passive optical components which serve to focus the transmission light exiting from the glass fiber 21 and to receive the component reflected or scattered at the target flow 41 (in this case, at drops 42 which pass by) at a suitably short distance (several millimeters to a few centimeters) from the path 43.

The distance of the projection module 3 from the target flow 41 is determined by the choice of the detection point 31 for the interaction point 61. This choice of interaction point 61 and its boundary conditions will be explained more exactly in the following with reference to FIG. 4.

Proceeding from the projection-side fiber end 23, the transmission light in the projection module 3 arrives at focusing optics 33 which, in this (simplest) case, comprise an aspheric lens and are so positioned that the projection-side end 23 of the glass fiber 21 lies in one of its foci and the detection point 31 of the drop 42 lies in the other focus.

In order that the returning beam originates exclusively from the drop 42 (or from a continuous target flow 41), the focus is selected in such a way that it is smaller than the lateral diameter of the drop 42 (or of the target flow 41) and is preferably directed to the middle position of the path 43.

An enlarged circular section of the target flow 41 is shown at the bottom is FIG. 3. This section shows a view of the surroundings of the detection point 31 in mid-path 43 considered from the direction of the optical axis 32 of the projection module 3. The drawing shows a schematic drop 42, whose diameter (depending on the type and adjustment of the target generator 4) is usually on the order of magnitude between 10 μm and few 100 μm and should be 10 μm in this specific example, and as an alternative a continuous target flow 41 of the same diameter which is indicated again by dashed lines.

The focus of the focusing optics 33 is selected in this case in such a way that it generates a light spot 34 on the target surface, which light spot 34 (5 μm in this example) is only half the size of the target diameter. This is especially advisable because substantial proportions of the transmission light striking the (curved) edge areas of the target are in any case deflected laterally to the extent that they can not be received again by the focusing optics 33. Accordingly, there is a sufficiently high sensitivity of the detection of a drop 42 in the detection point 31 with respect to the longitudinal direction of the path 43 and, at the same time, a high spatial resolution relative to lateral variations of the target flow 41.

With a continuous target flow 41 (jet), however, it may also be advisable for observing the calm and continuous surface character of the jet that the projection module 3 is directed to the edge area of the jet. Particularly in this case (but also in case of central orientation), it can be useful to use an especially sensitive detector such as a photomultiplier (PMT or SEV) in the detection module 1. As simulations have shown, internal reflections in the drop 42 (e.g., multiple reflections and scattering) make up the substantial detectable portions of the transmission light, so that it is not principally a matter of the reflection at the front outer surface.

The proportions of the transmission light which are reflected or backscattered by the drop 42 in the projection module 3 travel back into the glass fiber 21 again via the focusing optics 33, are conducted into the detection module 1 and are transmitted to the polarization-optical beam splitter 13 in a collimated manner by means of the in-coupling lens 14. In this example with polarization-optical beam splitting, only portions of the transmission light can be detected due to the change in the polarization impressed on the transmission light (e.g., through a linear polarization inherent to the laser diode or through a polarizer arranged after the transmission light source). The change in polarization can be brought about through scattering, rear wall reflection and/or multiple reflection in the drop 42. Components of the transmission light which are changed in this way with respect to their original polarization are coupled out of the returning transmission light bundle orthogonally by the beam splitter 13 and reach the detector 15 which is a photodiode, an optoelectronic detector with integrated amplifier, or a photomultiplier.

Due to the movement of the drops 42 on their path 43 through the visual field of the projection module 3 (orthogonal to the optical axis 32), an intensity curve which fluctuates over time is received by the projection module 3. In this way, a portion of the transmission light that is focused in the detection point 31 is reflected or backscattered when and only when a drop 42 passes the detection point 31 and it subsequently travels via the focusing optics 33 to the projection-side end 23 of the glass fiber 21 again and through the latter to the detector 15 in the detection module 1.

The portion of the transmission light coupled out by the beam splitter 13 is conducted to the detector 15 as an optical measurement signal. With the progressing generation of drops 42 from the drop generator 4, an electric signal which varies over time is formed at the output of the detector 15; this electric signal carries information about the time sequence of the presence of drops 42 in the detection point 31 and a synchronization signal for controlling the excitation laser 6 and/or the target generator 4 is obtained from it by means of a subsequent electronic circuit 7. This synchronization control is represented in FIG. 1 by connection lines to the excitation laser 6 and to the drop generator 4. However, controlling the excitation laser 6 based on the determined position of the drop 42 is often sufficient by itself for suitable control of the laser pulse for every drop 42 to form a plasma 51 with uniform emission conditions for the EUV or x-ray radiation with respect to time and/or space.

Additional adjustable or fixedly positioned optical elements which contribute to obtaining and processing signals in an efficient manner can be contained in both modules, the detection module 1 and the projection module 3, of the arrangement according to the invention.

To this end, the wedge plates 16, for example, which are shown in FIG. 2 (exclusively shown in the detection module 1) are provided for adjusting the focused light bundle with respect to the glass fiber 21 and are rotatably supported for this purpose. The incident angle of the transmission light bundle can accordingly be adapted with any desired accuracy to the position of the detection-side fiber end 22 (also in an analogous manner for the projection-side fiber end 23 in the projection module 3) so that an optimal coupling in of light is achieved.

Further, plane plates, quarter-wave plates or half-wave plates and deflecting mirrors or additional polarizers and spectral filters 18 can also be provided in one or both modules 1 and 3 for optimizing optical bundling and for signal transmission.

When using a light waveguide 2 that is not polarization-preserving, quarter-wave plates (not shown here because of the use of a polarization-preserving glass fiber 21) are also practical. Half-wave plates 17 (shown only in FIG. 2) can be used to facilitate adapting the transmission light polarization to the polarization direction of the polarization-preserving glass fiber 21 at the detection-side fiber end 22 and at the projection-side fiber end 23. However, since the projection module 3 should be particularly small and compact for use in the interaction chamber 5, it is recommended for reasons of space that the entire projection module 3 is rotatably mounted in the interaction chamber 5 instead of using a half-wave plate 17 in the projection module 3 for adapting the polarization directions of a polarization-preserving light waveguide 2 to the polarization states of the returning transmission light. Therefore, as is indicated in FIG. 1, the projection module 3 is preferably shaped cylindrically and possibly arranged in a cylindrical tube (not shown) which is completely shielded from the gas volume of the interaction chamber 5.

In the example described above, a polarization-optical beam splitting is assumed for coupling the optical measurement signal out of the transmission light bundle. However, a dielectric beam splitter 13, for example, can also be used for coupling out. Further, it is possible to replace the beam splitter 13 with a corresponding fiber-optic splitter or a waveguide component. Depending on the specific construction of the beam splitter, it may also be useful to add other components to the apparatus in order to optimize the beam splitting.

Other light sources 11 for generating the transmission light can also be used without departing from the framework of the invention. Apart from the simple laser diodes described above, equivalent multimode laser diodes, fiber lasers and fiber-coupled luminescent diodes, for example, are suitable for this purpose. Beyond the continuous light source described above, short pulse lasers with a high repetition rate can also advantageously be used as a transmission light source 11.

Figure 4:
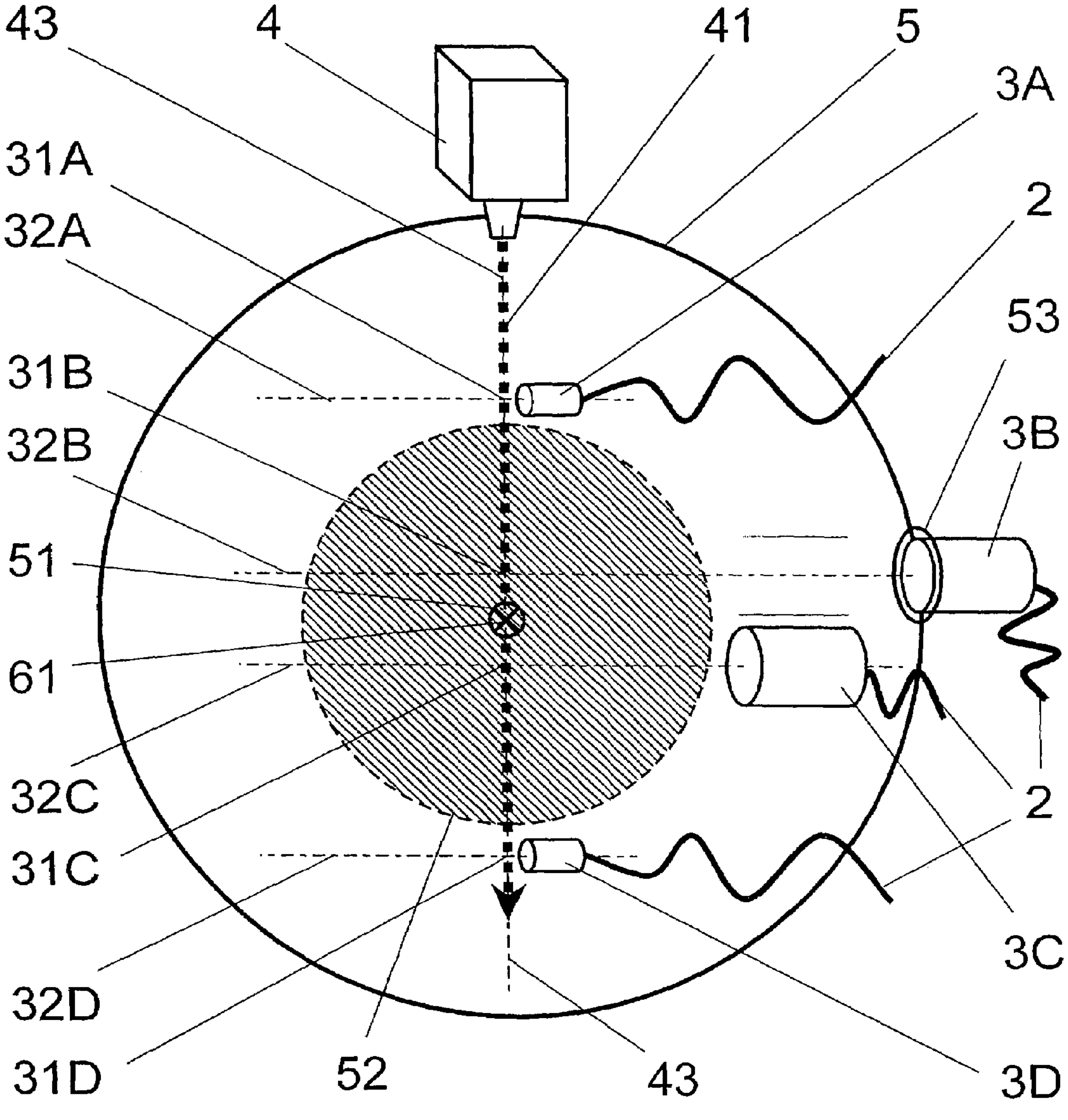
FIG. 4 shows different variants of the positioning of the projection module.

FIG. 4 shows variants for the positioning of the projection module 3 that can be used separately. The different variants A to D are decisively influenced by a spherical zone to be kept clear around the radiating plasma 51. The spherical surrounding zone to be kept clear within the vacuum chamber 5 which is indicated by a shaded area is a physically nondelimited, prohibited zone 52 whose extent around the plasma 51 is derived from various boundary conditions of radiation generation.

On one hand, the particle emission from the plasma 51 results in components or measuring devices of any design being extensively influenced or damaged by the plasma 51 within this prohibited zone, so that their life is appreciably reduced by the flow of fast particles. On the other hand, a further restriction results from collector optics which are provided for bundling the radiation emitted by the plasma 51 and which require a large, freely accessible solid angle as collector entrance angle for bundling sufficiently large proportions of the radially emitted radiation. The prohibited zone which must be kept clear is currently assumed to have a radius of several centimeters.

Because of the size of the prohibited zone 52, a compromise must be reached between a small distance of the projection module 3 from the target flow 41 with a large distance of the detection point 31 from the interaction point 61 of the plasma 51 on one hand and a greater distance of the projection module 3 from the target flow 1 with a short distance between the detection point 31 and the interaction point 61 on the other hand.

In a first variant A which is considered as a first extreme case, the projection module 3 is shown in the upper part of FIG. 4 as a simply constructed module 3A and associated optical axis 32A. In this position, the module 3A can be outfitted with a simple focusing lens 33 or a tapered fiber output of the fiber 2. The module 3A is directed between the target generator 4 and the interaction point 61 on the path 43 of the target flow 41; the detection point 31A (i.e., the intersection of the optical axis 32A and the path 43) is several centimeters (≧5 cm to 1 dm), but the focal length of the module 3A is only a few millimeters. In this case, the focusing optics 33 (not shown separately) of the projection module 3 can have a short focal length and can accordingly be designed in a very compact manner.

For the purpose of optimal droplet detection (through sufficiently high resolving power), the projection module 3 must have a suitable numerical aperture (NA). Assuming a resolution $d_{min}$=5 μm with a selected target diameter of 10 μm, the numerical aperture can be approximated by NA=0.61 $\lambda/d_{min}$, where λ is the wavelength of the transmission light.

This quantity, which at the same time characterizes the aperture ratio of the projection module 3, ensures that almost exclusively portions of the transmission light from the detection point 31 pass through the optical fiber 21 into the detection module 1. Interfering proportions which are also received only to a very small extent in this case can be eliminated in the light path in front of the detector 15 by a spectral filter 18 (shown only in FIG. 2) which is not compulsory. The projection module 3 in the position of module 3A is accordingly very compact and economical.

In a second preferred variant B, the optical axis 32B of the projection module 3 is likewise located between the target generator 4 and the interaction point 61, but the selected distance from the interaction point 61 is substantially smaller so that there is a substantially greater distance between the projection module 3 and target flow 41 while taking into account the prohibited zone 52 shown as a shaded area. In this case, the focusing optics 33 are designed with a longer focal length, but the numerical aperture is maintained analogous to variant A in order to maintain the same resolution. However, substantially more demanding focusing optics 33 are required as is shown schematically in FIG. 4 by the larger diameter of module 3B.

This second variant B of the positioning of the projection module 3 is more sensitive to scattered light from the plasma 51 but has the decisive advantage that the detection of the target flow 41 is carried out in the immediate vicinity in front of the interaction point 61 and therefore (when the influence of interference light is suppressed) permits a more accurate and simpler calculation of regulating variables for the generation of plasma compared with variant A. This variant B makes it possible to arrange the projection module 3—as is indicated for module 3B—outside the interaction chamber 5 and to direct it through a window 53 to the detection point 31. However, an arrangement inside the chamber (analogous to variant C described in the following) is also possible.

Since the detection of the target flow 41 can never be carried out directly in the interaction point 61, it is assumed as reasonable that the state of the target flow 41 can be determined from measurements at any locations other than the interaction point 61 which are not too far from it.

Accordingly, it seems realistic in variant C, shown in FIG. 4, to arrange the detection point 31C along the path 43 of the target flow 41 on the path 43 directly following the interaction point 61 rather than between the target generator 4 and the interaction point 61. All of the rest of the guidelines for the type of configuration of the projection module 3 and the position of detection point 31C and optical axis 32C are to be met analogous to variant B.

However, a measurement in the position according to variant C presupposes in addition that 1) the target behaves periodically; 2) parts of the target flow 41 pass the interaction point 61 virtually without being influenced and accordingly reach the detection point 31C; and 3) the time constants of the target fluctuations are large compared to the "flight times" from the interaction point 61 to the detection point 31C. These assumptions are to be presumed as met to a sufficient degree at least for a target flow 41 comprising liquid or solid droplets.

A final variant with module 3D is subject to the same conditions for measurement of the target flow 41 as stipulated in variant C. In this case, the associated optical axis 32D is arranged at a somewhat greater distance following the interaction point 61. The distance, orientation and focal length of the projection module 3 are selected analogous to variant A and module 3D is therefore arranged at a short distance from the detection point 31D. As in variant A, the projection module 3 is characterized by its special compactness and the simplicity of the optical components.

While the foregoing description and drawings represent the present invention, it will be obvious to those skilled in the art that various changes may be made therein without departing from the true spirit and scope of the present invention.

REFERENCE NUMBERS

1 detection module
11 transmission light source
12 collimating lens
13 beam splitter
14 in-coupling lens
15 detector
16 wedge plate
17 half-wave plate
18 spectral filter
2 light waveguide
21 glass fiber
22 detector-side fiber end
23 projection-side fiber end
3 projection module
31 detection point
32 optical axis
33 focusing optics
34 focus light spot
4 target generator (droplet generator)
41 target flow
42 drop
43 path
5 interaction chamber
51 plasma
52 prohibited spherical zone
53 window
6 excitation laser
61 interaction point
62 optical axis
7 electronic circuit (for generating a synchronization signal)

What is claimed is:

1. An arrangement for the optical detection of a moving target flow for pulsed energy beam pumped radiation generation based on a plasma in which a target generator is provided for generating a target flow advancing along a path and an energy beam for plasma generation is directed to a defined interaction point of the path of the target flow, this interaction point being located in a vacuum chamber for plasma generation, comprising:

said target generator providing a target flow of moving material with relatively constant target states in the interaction point;

said target flow having, at least in a recurring manner over time, identical conditions for the generation of plasma for radiation emission;

a sensor unit being provided for observation of the position of the target flow at a detection point which lies at a short distance from the interaction point on the path;

said sensor unit being provided for illuminating the target flow moving past with transmission light and for receiving proportions of the transmission light that are reflected at a portion of the illuminated target flow;

said sensor unit containing a detection module and a projection module, wherein the projection module having means for focusing the transmission light onto the detection point in the target flow, so that portions of transmission light are reflected from target material passing the detection point, and said reflected portions of the transmission light being received once more by said focusing means and said projection module and directed to said detection module; and a light waveguide being provided between the detection module and projection module for transmitting transmission light and optical signals resulting from reflected portions of the transmission light at the target flow passing the detection point.

2. The arrangement according to claim 1, wherein the target flow is a flow of discrete liquid drops, wherein the flow of discrete target drops and the projection module having a focus that defines the detection point at said flow of drops, is directed on the middle path of the drops to detect the drops in lateral and longitudinal directions within the flow of drops.

3. The arrangement according to claim 1, wherein the target flow is a flow of discrete solid, frozen targets.

4. The arrangement according to claim 1, wherein the target flow is a continuous liquid jet.

5. The arrangement according to claim 4, wherein the projection module is directed with its optical axis to the center of the target flow for detection of lateral variations.

6. The arrangement according to claim 4, wherein the projection module is directed with its detection point to an edge area of the target flow for detecting lateral variations.

7. The arrangement according to claim 1, wherein the projection module is arranged with its optical axis orthogonal to the direction of the path of the target flow and essentially different than the direction of the axis of the energy beam.

8. The arrangement according to claim 7, wherein the projection module is arranged with its optical axis orthogonal to the direction of the axis of the energy beam.

9. The arrangement according to claim 1, wherein the projection module has focusing optical elements for coupling the transmission light out of the light waveguide and for focusing on a spatial region having a smaller extent than the lateral dimension of the target flow.

10. The arrangement according to claim 9, wherein the projection module has focusing optics with a focal length of determined centimeters and a numerical aperture that is selected in such a way that a focus of the transmission light generated by the focusing optics in the detection point is smaller than the diameter of the target flow and proportions of the transmission light reflected by the target flow are received.

11. The arrangement according to claim 1, wherein the projection module is directed with its optical axis to a detection point which is at a distance along the path of the target flow of determined millimeters to a determined amount of centimeters from the interaction point of the excitation laser beam, wherein the optimal distance from the interaction point must be adjusted as a compromise between desired economical compactness of the projection module and the necessary accuracy of position determination of the target at the interaction point.

12. The arrangement according to claim 11, wherein the optical axis of the projection module is at a distance of determined centimeters to determined decimeters from the interaction point, wherein, for a relatively large distance from the interaction point such as this, the projection module has simple focusing optics with a short focal length and a defined numerical aperture, so that a high resolution of the target position is possible at a short distance from the detection point.

13. The arrangement according to claim 11, wherein the optical axis of the projection module is at a distance of determined millimeters from the interaction point, wherein, at such a short distance from the interaction point, the projection module has focusing optics with a long target-side focal length of determined centimeters but the same numerical aperture as with short focal length positioning, so that exacting focusing optics are provided for a high resolution of the target position at a great distance from the detection point.

14. The arrangement according to claim 11, wherein the projection module is directed with its optical axis to the target flow in a detection point positioned in front or behind the interaction point.

15. The arrangement according to claim 11, wherein the projection module is directed with its optical axis to the target flow in a detection point after the interaction point.

16. The arrangement according to claim 1, wherein the detection module has optical elements for generating the transmission light, for coupling the transmission light into the light waveguide and for coupling the transmission light out of the light waveguide, optical components for separating proportions of the transmission light that are reflected or backscattered in the detection point as optical measurement signals, and an optoelectronic detector for converting the optical measurement signal into an electric signal.

17. The arrangement according to claim 16, wherein the optical component for separating the optical measurement signal is a light waveguide with integrated direction-dependent signal splitting.

18. The arrangement according to claim 16, wherein the optical component for separating the optical measurement signal is a polarization-optical beam splitter, wherein the transmission light is linearly polarized.

19. The arrangement according to claim 18, wherein a polarization-preserving fiber is provided as light waveguide between the detection module and projection module.

20. The arrangement according to claim 18, wherein the detection module has an additional half-wave plate for adjustment of the polarization plane.

21. The arrangement according to claim 16, wherein the detection module contains an additional spectral filter element being transparent for the optical measurement signal reflected by the target flow and being opaque for scattered light originating from the laser beam and plasma.

22. The arrangement according to claim 16, wherein a continuous transmission light source with a light bundle of restricted divergence is provided for generating the transmission light.

23. The arrangement according to claim 22, wherein the transmission light source has a wavelength which is different than the wavelength of the excitation laser.

24. The arrangement according to claim 22, wherein the transmission light source is a waveguide-coupled luminescent diode.

25. The arrangement according to claim 22, wherein the transmission light source is a fiber laser.

26. The arrangement according to claim 22, wherein the transmission light source is a multimode laser diode.

27. The arrangement according to claim 22, wherein the transmission light source is a short pulse laser with a high repetition rate.

28. The arrangement according to claim 25, wherein the light waveguide between the detection module and the projection module uses a single-mode fiber, so that only one fundamental mode of the laser radiation used as transmission light can be transmitted.

29. The arrangement according to claim 16, wherein rotatable wedge plates are provided in the detection module for orienting a bundle of the transmission light before entering the light waveguide.

30. The arrangement according to claim 1, wherein the detection module is connected via the output of its detector to an electronic circuit for amplifying and processing the electric signal converted from the reflected optical signals and for generating a synchronization signal.

31. The arrangement according to claim 30, wherein the electronic circuit communicates with the pulsed energy beam source for generating a synchronization signal.

32. The arrangement according to claim 30, wherein the electronic circuit communicates with the target generator for generating a synchronization signal.

33. The arrangement according to claim 1, wherein said detection module is arranged at a spatial distance from the projection module so as to be shielded from interfering influences from plasma generation and resulting radiation.

34. The arrangement according to claim 7, wherein the energy beam is a laser beam.

35. The arrangement according to claim 7, wherein the energy beam is an electron beam.

36. The arrangement according to claim 17, wherein the optical component for separating the optical measurement signal is a fiber-optic circulator.

37. The arrangement according to claim 24, wherein the transmission light source is a fiber-coupled luminescent diode.

* * * * *